United States Patent

Solomon

[11] Patent Number: 5,923,905
[45] Date of Patent: *Jul. 13, 1999

[54] MANUAL FILM WINDER CLOSES LIGHT LOCK OF FILM CARTRIDGE IN ONE-TIME-USE CAMERA

[75] Inventor: Jeffrey A. Solomon, Spencerport, N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/867,746

[22] Filed: Jun. 3, 1997

[51] Int. Cl.⁶ .................................................... G03B 17/02
[52] U.S. Cl. .............................. 396/6; 396/392; 396/513; 396/538
[58] Field of Search ................................. 396/6, 411, 511, 396/512, 513, 514, 516, 518, 538, 392

[56] References Cited

U.S. PATENT DOCUMENTS

| 2,704,969 | 3/1955 | Mische | 396/411 |
| 3,736,015 | 5/1973 | Dierks et al. | 396/411 |
| 5,530,502 | 6/1996 | Petruchik | 396/411 |
| 5,555,057 | 9/1996 | DiRisio | 396/418 |
| 5,579,070 | 11/1996 | Smart et al. | 396/538 |
| 5,600,395 | 2/1997 | Balling et al. | 396/6 |
| 5,602,609 | 2/1997 | Balling | 396/284 |
| 5,614,976 | 3/1997 | Smart et al. | 396/392 |
| 5,617,169 | 4/1997 | Takaba et al. | 396/284 |
| 5,629,750 | 5/1997 | Smart et al. | 396/538 |

FOREIGN PATENT DOCUMENTS 8-262635  10/1996  Japan .

*Primary Examiner*—Eddie C. Lee
*Attorney, Agent, or Firm*—Roger A. Fields

[57] ABSTRACT

A camera for use with a film cartridge having a spool rotatable in a film winding direction to wind an exposed filmstrip into the cartridge and a light lock movable to be closed after the exposed filmstrip has been wound into the cartridge, comprising a film winder rotatable in engagement with the spool in the film winding direction to rotate the spool in the same direction, and a closing actuator rotatable in engagement with the light lock to close the light lock and including a film sensor for sensing the presence and absence of the exposed filmstrip to determine whether the exposed filmstrip has been wound into the cartridge, is characterized in that the film winder and the closing actuator are mutually coupled when the film sensor senses the presence of the exposed filmstrip, to prevent the film sensor substantially from applying any pressure against the exposed filmstrip, and when the film sensor senses the absence of the exposed filmstrip, to rotate the closing actuator to close the light lock when the film winder is rotated in the film winding direction.

1 Claim, 6 Drawing Sheets

MANUAL FILM WINDER CLOSES LIGHT LOCK OF FILM CARTRIDGE IN ONE-TIME-USE CAMERA

FIELD OF THE INVENTION

The invention relates generally to the field of photography, and in particular to one-time-use cameras. More specifically, the invention relates to a one-time-use camera in which a film winder is rotated to close a light lock of a film cartridge.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a conventional 35 mm film cartridge in a cartridge receiving chamber, a film take-up spool in a film supply chamber, a fixed-focus taking lens, a film metering mechanism with a rotatably supported metering sprocket that engages the filmstrip, a manually rotatable thumbwheel rotatably engaged with a film spool inside the film cartridge, a single-blade shutter, a manually depressible shutter release button, a rotatable frame counter for indicating the number of exposures remaining for picture-taking, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

To use the one-time-use camera, after the photographer takes a picture he manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip, to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer, and he forwards the used camera parts to the manufacturer for recycling, i.e. remanufacture.

Typically, during original manufacture or recycling (remanufacture) of the one-time-use camera, a film leader protruding from a fresh cartridge is attached to the film take-up spool, the fresh cartridge and the film take-up spool are loaded into the cartridge receiving and film supply chambers, and an intermediate leader section which bridges the film take-up spool and the fresh cartridge is engaged with the metering sprocket. The front and rear cover parts are connected to the main body part and/or to the front cover part to complete the camera unit. Then, an engageable end of the take-up spool which protrudes from the film roll chamber is rotated to factory prewind substantially the entire length of the unexposed filmstrip from the fresh cartridge onto the film take-up spool and to rotate the metering sprocket to increment the frame counter to its total-available frame number setting. Lastly, the outer box or label is placed on the camera unit.

The conventional cartridge typically used in the one-time-use camera has a light-trapping plush, within a film egress/ingress slot, to prevent ambient light from entering the film cartridge through the slot. As contrasted with the conventional cartridge, prior art U.S. Pat. No. 5,357,303 issued Oct. 18, 1994 discloses a new-type cartridge having a spool rotatable in a film winding direction to wind an exposed filmstrip including a trailing film end portion into the film cartridge, and a light lock pivotable to be closed after the trailing film end portion has been wound into the film cartridge. The new-type cartridge can be used in a one-time-use camera. For example, U.S. Pat. No. 5,600,395 issued Feb. 4, 1997 and U.S. Pat. No. 5,614,976 issued Mar. 25, 1997 each discloses a one-time-use camera for use with the new-type cartridge. The new-type camera comprises a thumbwheel manually rotatable in coaxial engagement with the spool inside the film cartridge, in the film winding direction, to similarly rotate the spool to wind the exposed filmstrip including the trailing film end portion into the film cartridge, and a closing actuator coaxially engaged with the light lock to begin to close the light lock when an integral film sensor of the closing actuator senses that the trailing film end portion has been wound into the film cartridge. The thumbwheel is coupled with the closing actuator via a closing lever and a pair of meshing gears to continue to close the light lock when the thumbwheel is further rotated in the film winding direction.

In the new-type camera, the film sensor is adapted to abut the unexposed filmstrip to determine when the trailing film end portion has been wound into the film cartridge. The inherent resistance or stiffness of the unexposed filmstrip against the film sensor operates to prevent the film sensor from being moved, which in turn prevents the closing actuator from being moved to begin to close the light lock. Thus, the film sensor exerts some pressure against the exposed filmstrip.

SUMMARY OF THE INVENTION

A camera for use with a film cartridge having a spool rotatable in a film winding direction to wind an exposed filmstrip into the cartridge and a light lock movable to be closed after the exposed filmstrip has been wound into the cartridge, comprising a film winder rotatable in engagement with the spool in the film winding direction to rotate the spool in the same direction, and a closing actuator rotatable in engagement with the light lock to close the light lock and including a film sensor for sensing the presence and absence of the exposed filmstrip to determine whether the exposed filmstrip has been wound into the cartridge, is characterized in that:

the film winder and the closing actuator are mutually coupled when the film sensor senses the presence of the exposed filmstrip, to prevent the film sensor substantially from applying any pressure against the exposed filmstrip, and when the film sensor senses the absence of the exposed filmstrip, to rotate the closing actuator to close the light lock when the film winder is rotated in the film winding direction. Since the film sensor substantially does not apply any pressure against the exposed filmstrip, this is an improvement as compared to U.S. Pat. No. 5,600,395 and U.S. Pat. No. 5,614,976.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

FILM CARTRIDGE

Figure 1:
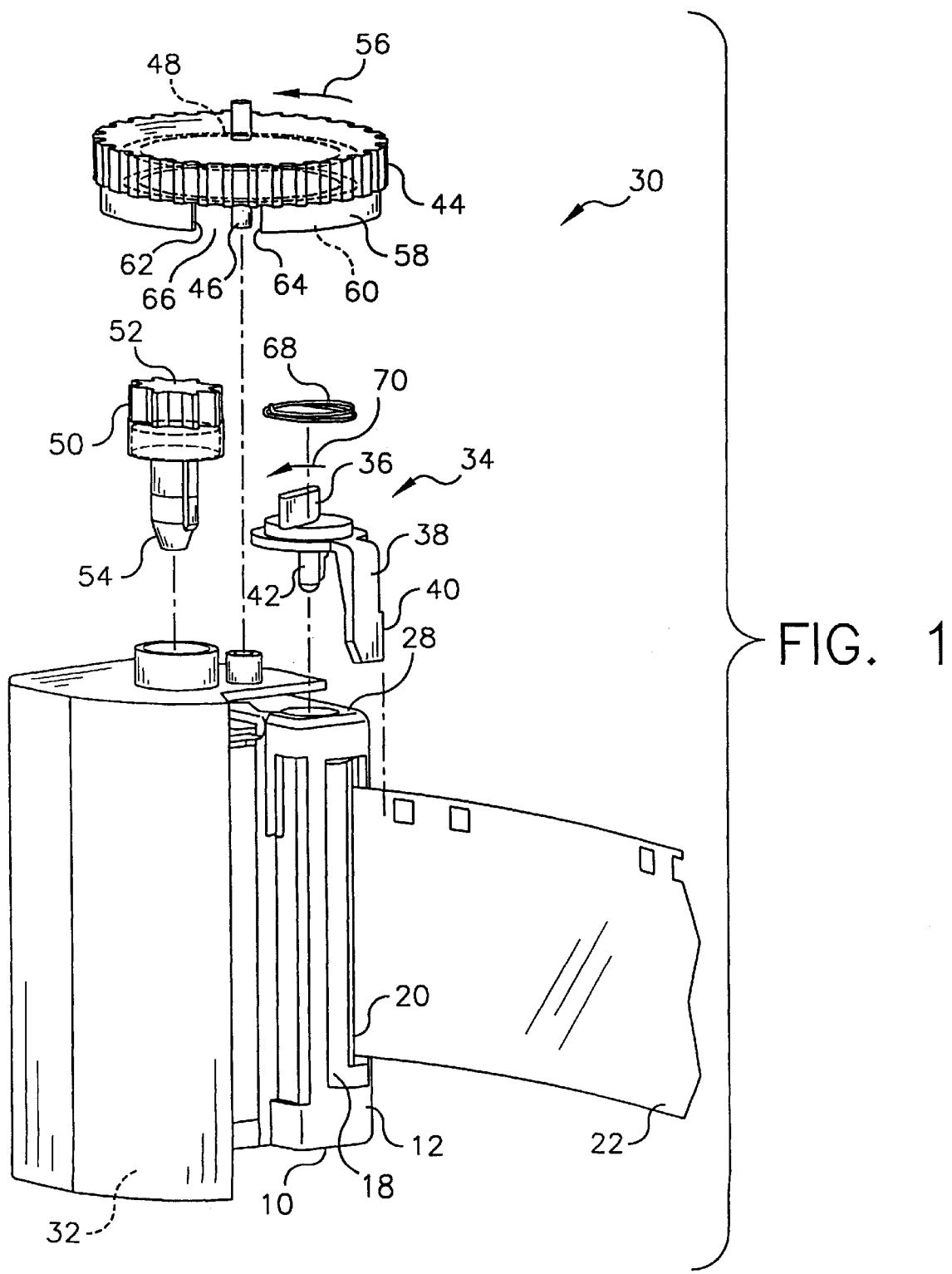
FIG. 1 is an exploded perspective view of a one-time-use camera according to a preferred embodiment of the invention.
Figure 2:
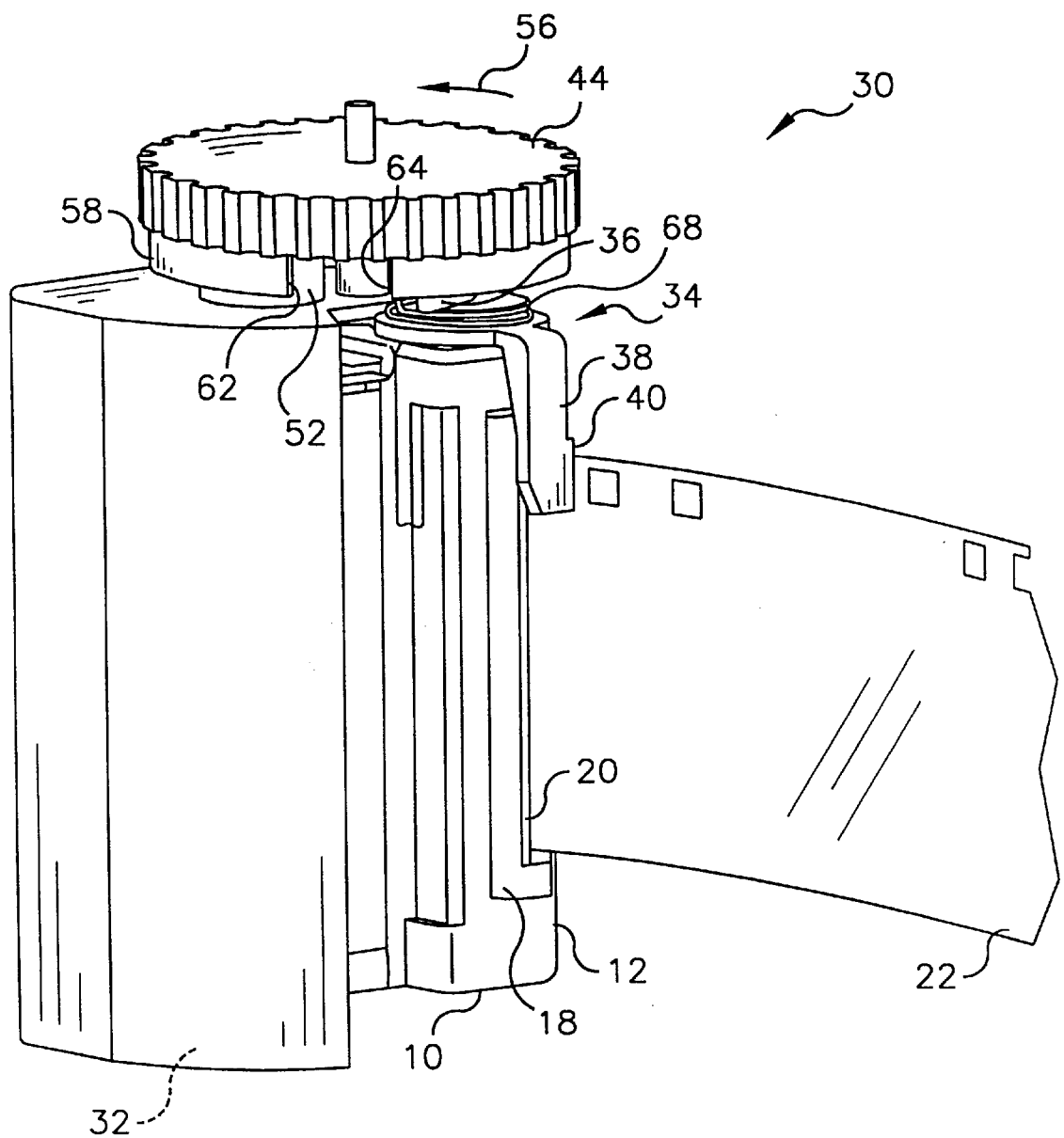
FIG. 2 is an assembled perspective view of the camera components shown in FIG. 1.
Figure 3:
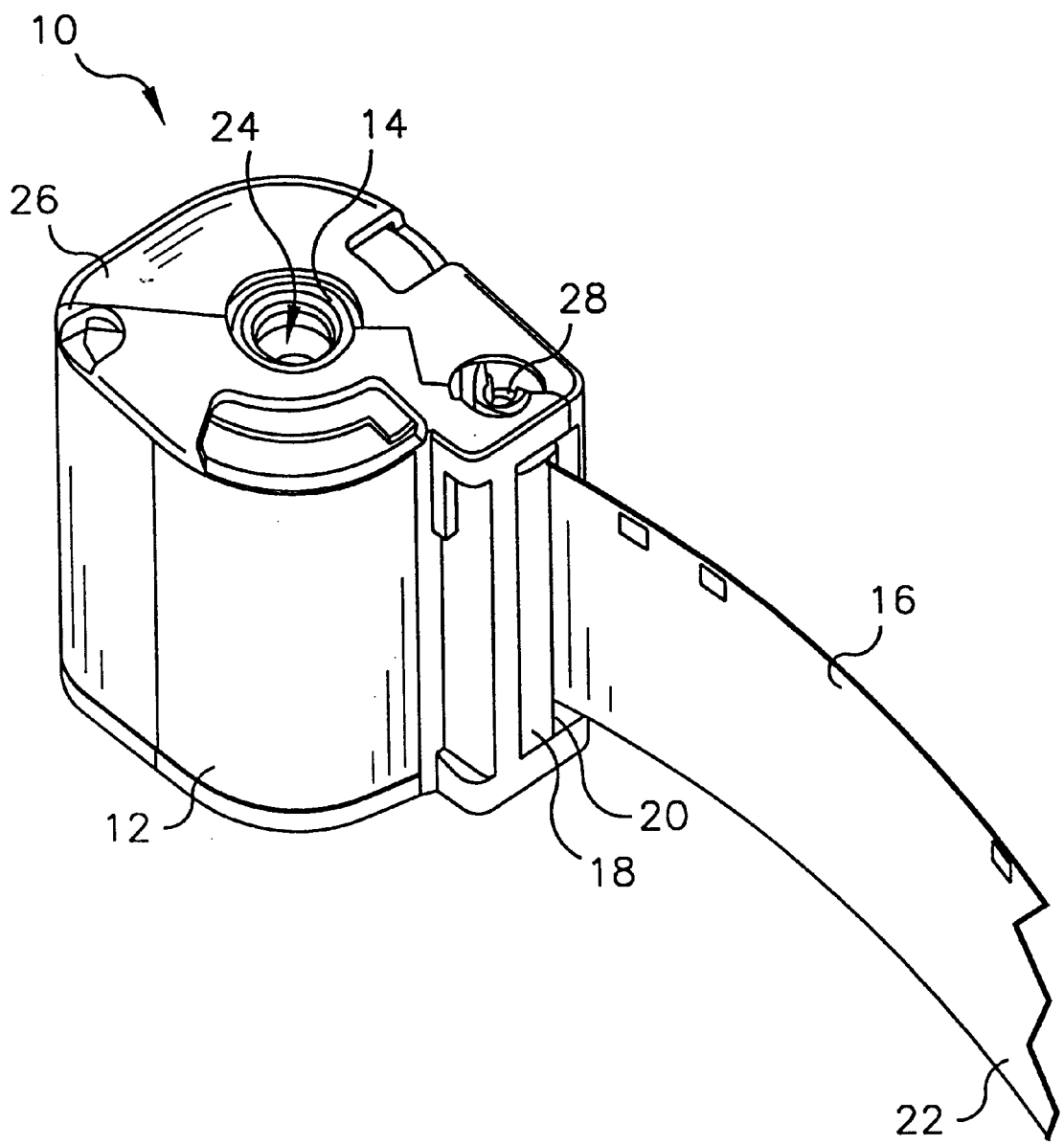
FIG. 3 is a perspective view of the film cartridge included in the one-time-use camera.

Referring now to the drawings, FIGS. 1–3 show a film cartridge 10 similar in operation to ones disclosed in prior art U.S. Pat. No. 5,357,303, issued Oct. 18, 1994, and U.S. Pat. No. 5,231,438, issued Jul. 27, 1993. The film cartridge 10 includes a cartridge shell 12 that contains a flanged spool 14 on which is to be wound an exposed filmstrip 16. A slightly elastic light lock 18 is supported within a film slot 20 in the cartridge shell 12 to be pivoted open to permit film movement into the shell, through the slot, and to be pivoted closed to prevent ambient light from entering the shell, through the slot.

FIGS. 1–3 show the film cartridge 10 with the light lock 18 open and all but a trailing film end portion 22 of the exposed filmstrip 16 wound into the cartridge shell 12. The light lock 18 is closed after the exposed filmstrip 16 including the trailing film end portion 22 is wound into the cartridge shell 12.

The spool 14 has a coaxial drive cavity 24 accessible at a drive end 26 of the cartridge shell 12 and the light lock 18 has a coaxial drive cavity 28 accessible at the same end of the cassette shell. See FIG. 3.

CAMERA

A partially shown camera 30 with which the film cartridge 10 is to be used is shown in FIGS. 1–6.

As shown in FIGS. 1 and 2, the camera 30 includes a cartridge chamber 32 for the film cartridge 10. A rotatable closing actuator 34 is intended to pivot the light lock 18 closed after the exposed filmstrip 16 including the trailing film end portion 22 is wound into the cartridge shell 12. The closing actuator 34 comprises an integral radial rib 36, an integral film sensor lever 38 having a sensor head 40, and an integral coaxial drive stem 42. The sensor head 40 of the film sensor lever 38 is adapted to abut the unexposed filmstrip 16 before the trailing film end portion 22 is wound into the cartridge shell 12, to prevent the closing actuator 34 from being rotated to begin to close the light lock 18, and to be moved to take the place of the exposed filmstrip when the trailing film end portion is wound into the cartridge shell, to allow the closing actuator to be rotated to begin to close the light lock. The drive stem 42 is located in the drive cavity 28 of the light lock 18 to rotationally engage the light lock in order to pivot the light lock closed.

A film winder thumbwheel 44 has an integral rotation support stem 46 and a circular array of teeth 48. Respective ones of the teeth 48 are engaged with successive teeth 50 of a pinion gear 52. The pinion gear 52 has an integral drive stem 54 located in the drive cavity 24 of the spool 14 to rotationally engage the spool. See FIGS. 1–3. Thus, when the thumbwheel 44 is manually rotated in a film winding direction 56, the pinion gear 52 similarly rotates the spool 14 to wind the exposed filmstrip 16 including the trailing film end portion 22 into the cartridge shell 12.

As shown in FIGS. 1 and 4–6, the thumbwheel 44 includes an integral arcuate concentric rib 58 on its underside. The arcuate rib 58 has an inner curved periphery 60 and a pair of opposite rib ends 62 and 64. The rib ends 62 and 64 are separated to provide a gap 66 between them.

A light torsion spring 68 biases the closing actuator 34 in a closing direction 70 for the sensor head 40 to abut the exposed filmstrip 16 including the trailing film end portion 22. See FIGS. 1, 2 and 4. The closing direction 70 is the direction the closing actuator 34 is to be rotated to pivot the light lock 18 closed. Inherent film resistance or film stiffness at the sensor head 40 is greater than the bias of the spring 68. Thus, the spring 68 is ineffective to rotate the closing actuator 34 in the closing direction 70 as long as there is a film presence at the sensor head 40.

Figure 4:
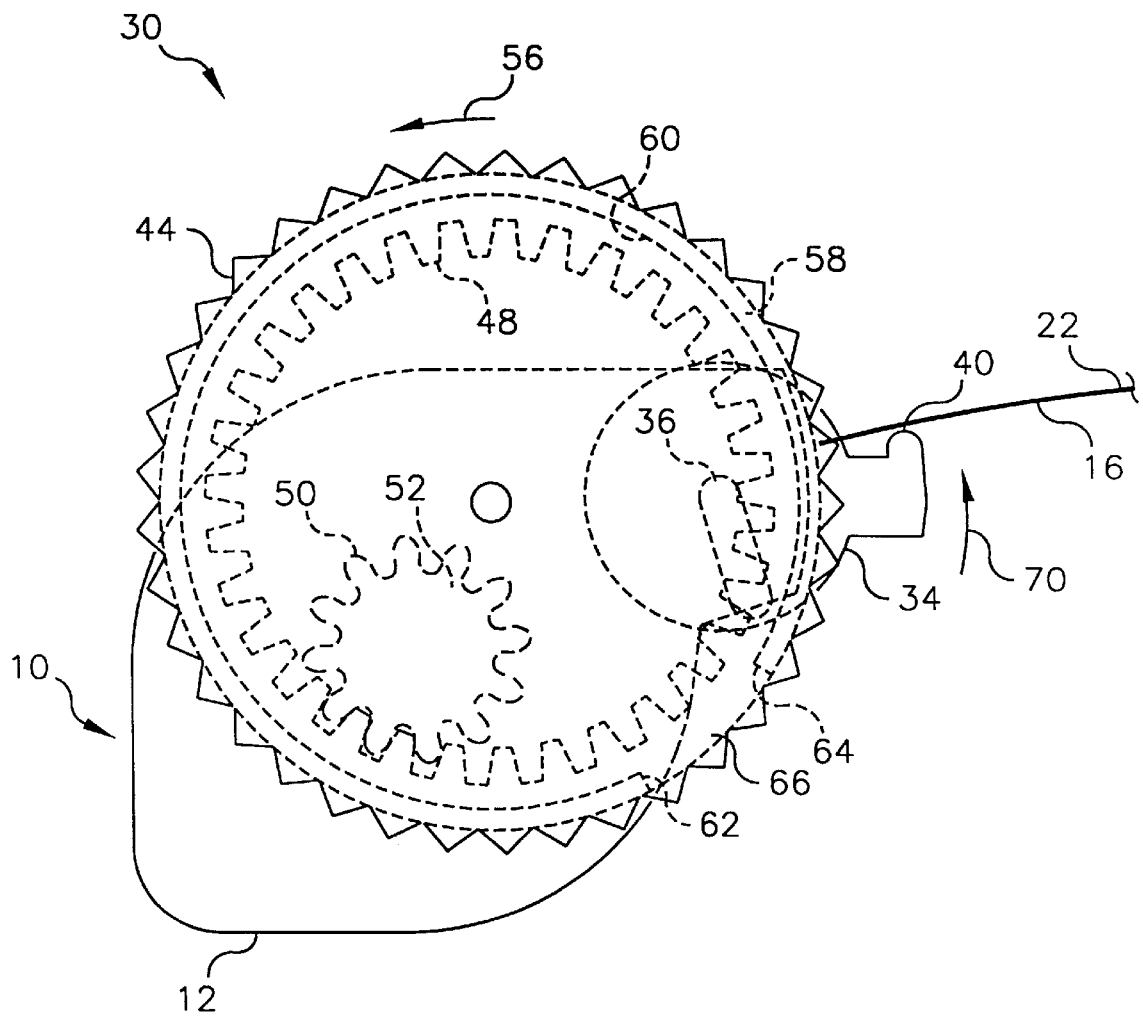
FIGS. 4, 5 and 6 are top plan views of the camera components depicting their sequence of operation.

As shown in FIG. 4, the radial rib 36 of the closing actuator 34 usually abuts the inner curved periphery 60 of the arcuate rib 58. This prevents the sensor head 40 of the closing actuator 34 substantially from applying any pressure against the exposed filmstrip 16 including the trailing film end portion 22.

When the thumbwheel 44 is rotated in the film winding direction 56 to momentarily position the gap 66 at the radial rib 36, the film resistance at the sensor head 40 prevents the spring 68 from moving the radial rib into the gap. Thus, the closing actuator 34 is not moved in the closing direction 70.

Figure 5:
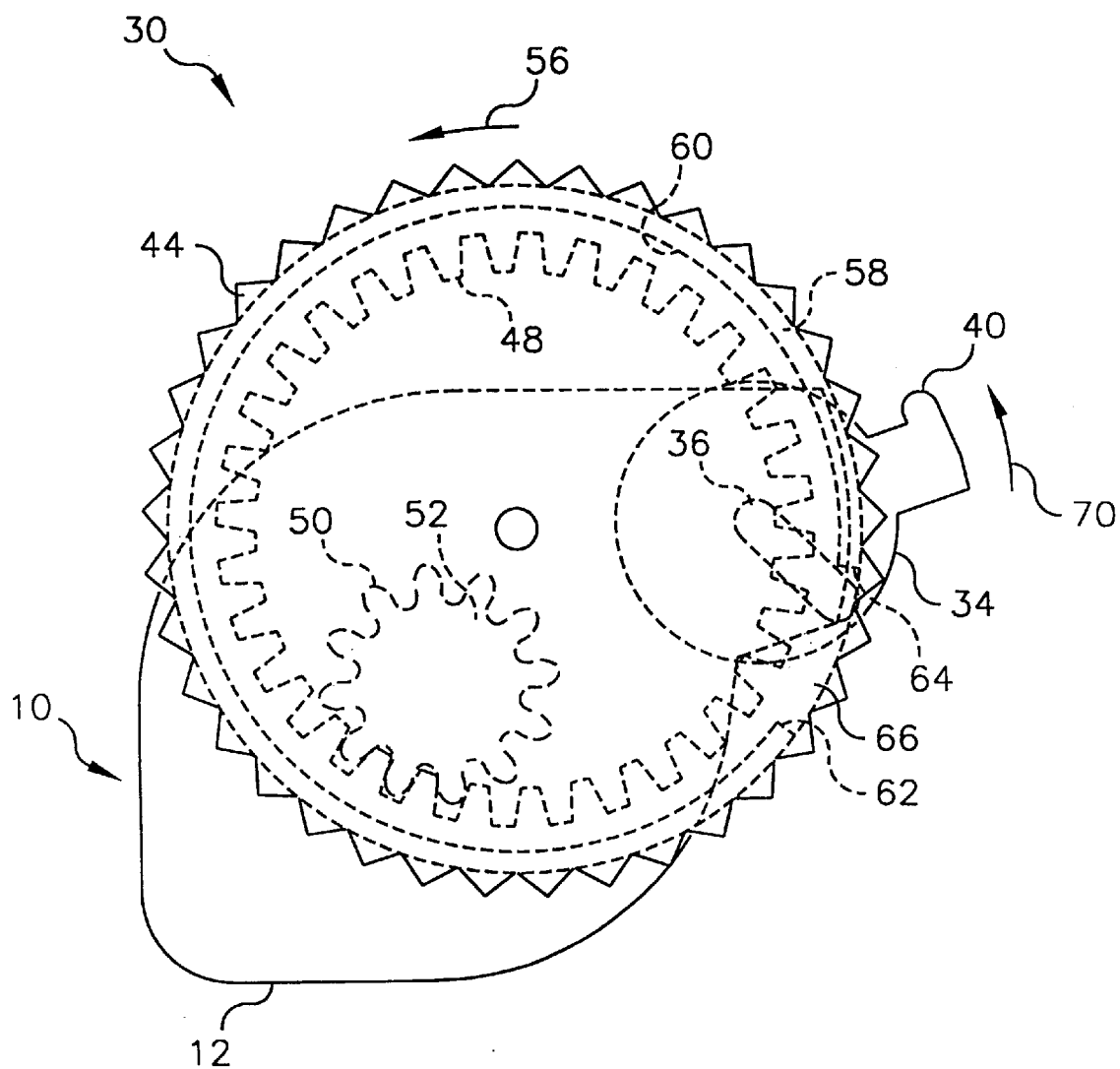

If, however, as shown in FIG. 5, the trailing film end portion 22 has been wound into the cartridge shell 12, there is no film resistance at the sensor head 40. Consequently, when the thumbwheel 44 is rotated in the film winding direction 56 to position the gap 66 at the radial rib 36, the spring 68 rotates the closing actuator 34 to move the radial rib into the gap and against the rib end 64. Thus, the closing actuator 34 is rotated in the closing direction 70 to begin to close the light lock 18.

Continued rotation of the thumbwheel 44 in the film winding direction 56 separates the rib end 36 from the radial rib 36. The spring 68 is effective to only rotate the closing actuator 34 about twenty degrees in the closing direction 70, which leaves the light lock 18 partially open.

Figure 6:
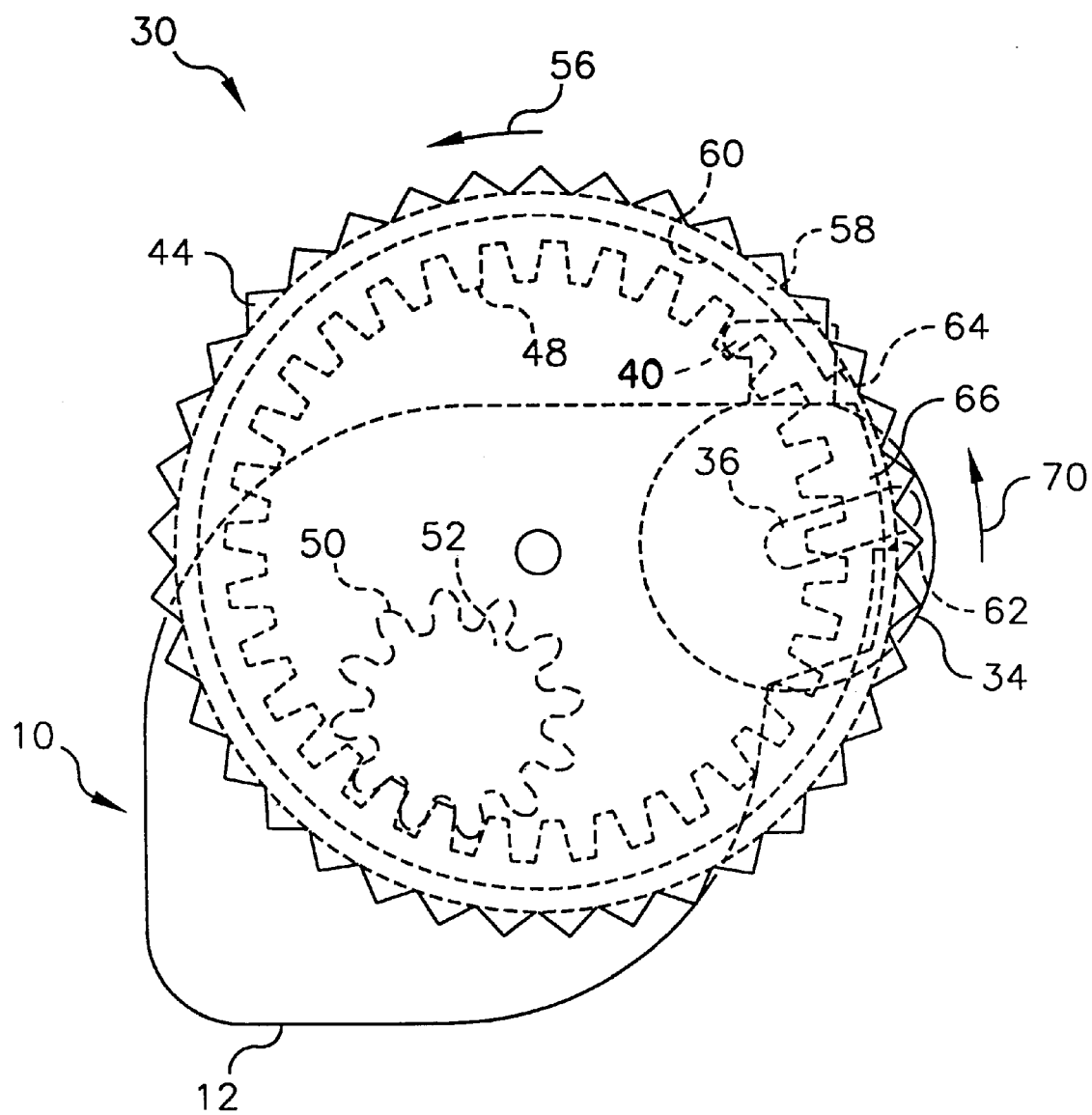

As shown in FIG. 6, further rotation of the thumbwheel 44 in the film winding direction 56 moves the rib end 62 against the radial rib 36 and in turn the rib end swings the radial rib to rotate the closing actuator 34 in the closing direction 70 to completely close the light lock 18. Then, the thumbwheel 44 is prevented from being further rotated in the film winding direction 56.

The invention has been described with reference to a preferred embodiment. However, it will be appreciated that variations and modifications can be effected by a person of ordinary skill in the art without departing from the scope of the invention.

PARTS LIST 10. film cartridge
12. cartridge shell
14. flanged spool
16. filmstrip
18. light lock
20. film slot
22. trailing film end portion
24. drive cavity
26. drive end
28. drive cavity
30. one-time-use camera
32. cartridge chamber
34. closing actuator
36. radial rib
38. film sensor lever
40. sensor head
42. drive stem
44. thumbwheel
46. support stem
48. wheel teeth
50. gear teeth
52. pinion gear
54. drive stem
56. film winding direction
58. arcuate rib
60. inner periphery
62. rib end
64. rib end
66. gap
68. torsion spring
70. closing direction

What is claimed is:

1. A camera for use with a film cartridge having a spool rotatable in a film winding direction to wind an exposed filmstrip including a trailing film end portion into the cartridge and a light lock movable to be closed after the trailing film end portion has been wound into the cartridge, comprising a thumbwheel manually rotatable in engagement with the spool in the film winding direction to rotate the spool in the same direction and including a concentric arcuate rib having an inner periphery and a pair of opposite rib ends separated to provide a gap between the rib ends, and a closing actuator rotatable in engagement with the light lock to close the light lock and including a film sensor adapted to contact the unexposed filmstrip before the trailing film end portion is wound into the cartridge to prevent said closing actuator from being rotated to begin to close the light lock and to be moved to take the place of the exposed filmstrip when the trailing film end portion is wound into the cartridge to allow the closing actuator to be rotated to begin to close the light lock, is characterized in that:

said closing actuator includes a protuberance which is adapted to abut said inner periphery of the rib, when the film sensor contacts the exposed filmstrip, and which is prevented from being moved into said gap, when said thumbwheel is rotated in the film winding direction to position the gap at the protuberance. because said film sensor is abutting the exposed filmstrip; and a spring urges said protuberance against said inner periphery of the rib to move the protuberance into said gap, when said thumbwheel is rotated in the film winding direction to position the gap at the protuberance, and said film sensor is moved to take the place of the exposed filmstrip, when the trailing film end portion is wound into the cartridge, to permit one of said rib ends to swing the protuberance within said gap to rotate said closing actuator to close the light lock when said thumbwheel is rotated in the film winding direction.

* * * * *